Nov. 24, 1925.  1,562,685
J. F. O. BURMAN
MOLD FOR PEDAL CUSHIONS
Filed Oct. 3, 1923
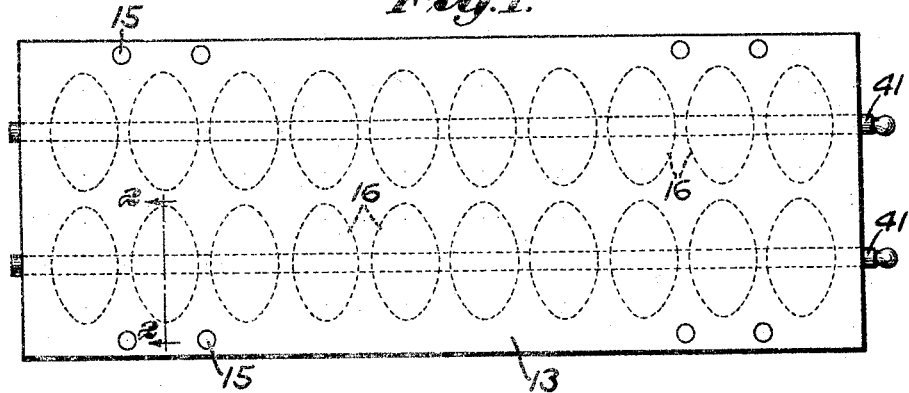
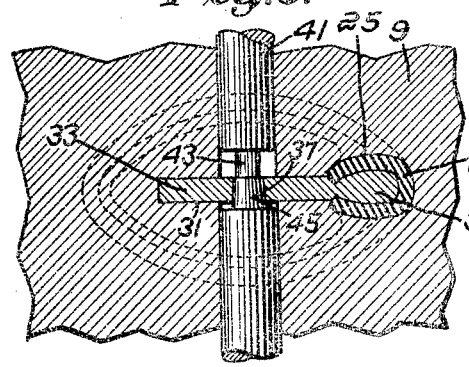
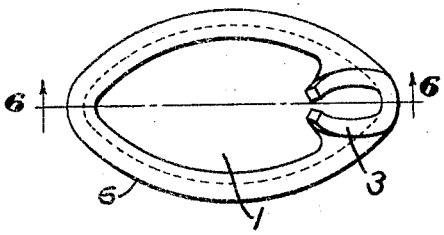
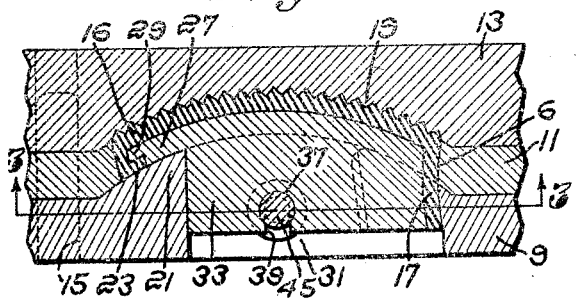
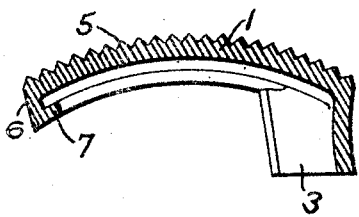
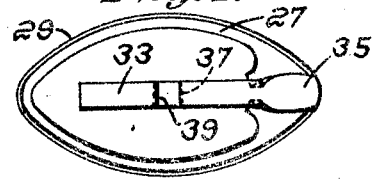
Inventor:
Joseph F. O. Burman,
by Emery Booth Janney & Varney
Attys.

Patented Nov. 24, 1925.

1,562,685

UNITED STATES PATENT OFFICE.

JOSEPH F. O. BURMAN, OF BROCKTON, MASSACHUSETTS.

MOLD FOR PEDAL CUSHIONS.

Application filed October 3, 1923. Serial No. 666,308.

*To all whom it may concern:*

Be it known that I, JOSEPH F. O. BURMAN, a citizen of the United States, and a resident of Brockton, county of Plymouth, and State of Massachusetts, have invented an Improvement in Molds for Pedal Cushions, of which the following description, in connection with the accompanying drawings, is a specification, like characters on the drawings representing like parts.

My invention relates to molds and particularly but not exclusively to one for molding a rubber pedal cushion.

My invention will be best understood from the following description when read in light of the accompanying drawings showing one specific embodiment of my invention, while the scope of my invention will be more particularly pointed out in the appended claims.

In the drawings:—

Fig. 1 shows a plan view of a mold constructed according to my invention;

Fig. 2 is a section on the line 2—2 of Fig. 1;

Fig. 3 is a section on the line 3—3 of Fig. 2;

Fig. 4 is a bottom view of the core member;

Fig. 5 is a bottom view of the pedal cushion; and

Fig. 6 is a section on the line 6—6 of Fig. 5.

The pedal cushion which constitutes the article formed by the mold hereinafter described comprises a portion 1 which covers and forms a cushion for the top of the plate portion of the pedal and the portion 3 which embraces the arm of the pedal. The upper surface of the portion 1 of the plate portion of the pedal cushion is corrugated as is indicated at 5 in Fig. 6, while the under side of the marginal portion 6 is provided with a lip 7 for engaging the under side of the plate portion of the pedal. The arm engaging portion of the cushion extends outwardly from one end of the plate portion and as is indicated in Fig. 5 is U-shaped being open towards the center of the article so that the portion 3 may be made to embrace the arm of the pedal.

Referring particularly to Figs. 2, 3 and 4 of the drawings the mold for the article just described comprises the base member 9 upon which rests a plate 11 while on the plate rests a cover member 13, dowels 15 carried by the base member and projecting into perforations in the members 11 and 13 being provided to secure the parts in alignment. If desired the plate 11 may be permanently secured to either the cover 13 or the base 9, but preferably it is secured to neither of these parts so that it may be removed from the base after the cover is removed. For convenience however the plate 11 may be considered as part of the base member.

The separable members which form the mold are formed to provide a mold chamber 16 for the portion 1 of the pedal cushion and the mold chamber 17 for the arm engaging portion of the pedal cushion. To this end the cover member 13 of the mold is hollowed out formed with corrugations 19 corresponding to the upper corrugated surface 5 of the article, while the plate 11 is provided with an opening the peripheral wall of which corresponds to the marginal portion 6 of the article. The base member 9 is provided with a raised portion 21, the upper surface 23 of which corresponds to the lower side of the plate portion 1 of the pedal cushion, and in the base member is formed a recess providing the mold chamber 17 heretofore mentioned, the wall 25 of which corresponds to the outside of the pedal arm engaging portion 3 of the pedal cushion.

For shaping the interior portions of the pedal cushion I provide a core member which in the particular embodiment of my invention submitted consists of a curved plate 27 the lower concave side of which rests upon the surface 23 of the raised portion of the base member, while the marginal portion of the convex side is provided with a peripheral flange 29 shaped to cause the lip 7 of the article to be formed. In the raised portion 21 of the base member is a central, longitudinally disposed slot or recess 31 which opens into the mold chamber 17. The concave side of the plate 27 of the core member is provided with a shank or lug 33 which extends into and fits the slot 31. One end 35 of the shank or lug 33 is formed to conform to the interior of the pedal arm engaging portion of the pedal cushion and extends into the chamber 17.

For positioning and locking the core member in proper relation to the mold the shank 33 is provided with a circular perforation 37 which is intersected by a slot 39 extending to the bottom of the shank, the slot being of width less than the diameter of the perforation 37 as is clearly illustrated in Figs. 2 and 3. Mounted for reciprocation in the base member 9 of the mold is a rod 41 which is provided with a pair of adjacent reduced diameter portions 43 and 45. When the rod is moved into the position shown by Fig. 3 the portion 45 enters the perforation 37 and thereby securely locks the core member in position, while when the rod is moved downwardly as viewed in Fig. 3 to bring the reduced diameter portion 43 opposite the slot 39 the core member can be removed from the mold by reason of the fact that the reduced diameter portion 43 is of less diameter than the width of the slot 39.

As indicated by Fig. 1 I provide the base member with a plurality of mold chambers so that a number of articles can be simultaneously molded. These chambers are arranged in rows as clearly indicated in the drawing, which enables me to use but a single rod 41 for each row so that the same rod may take care of a number of core members.

The operation is as follows: The core members are placed in position and locked and a plastic mass of rubber is then placed in the mold chambers 16, whereupon the cover is placed in position and subjected to pressure, which causes the rubber to fill all the cavities of the mold chambers. The cover and if desired the plate 11 are then removed and the article extracted together with the core, the latter then being pulled out of the article and returned to the mold.

Although I have described for purposes of illustration one specific embodiment of my invention it is to be understood that I am not limited thereby to its particular mechanical details, but that within the scope of my invention wide deviations may be made therefrom without departing from the spirit of my invention.

Claims:

1. In a mold of the character described, a base member having a plurality of raised portions each provided with a central longitudinal slot, said slots at one end being widened, means superimposed on said base member and forming recesses and a mold cover above said raised portions, core members having portions fitting the upper surfaces of said raised portions of said base member and adapted to be received in said openings, said core members having shank portions fitting said slots and having portions extending into said widened portions of said slots, and a locking bolt mounted for reciprocation in said base member for engaging said portions of said core members fitting said slots for holding them in position.

2. In a mold for an article of the character described, a mold body comprising separable parts forming an internal chamber conforming to the exterior of said article, a slot in said mold body communicating with said chamber, a core member having a body resting on a wall of said chamber, said core member having a portion extending into said slot, and means carried by said mold body and engaging said portion of said core member in said slot for releasably holding said core member in position.

3. In a mold for a pedal cushion having a plate cover and a pedal arm engaging portion, means providing separable parts forming a mold chamber for said plate cover portion of said article, a slot in one of said separable parts, one end of said slot providing a mold chamber for said pedal arm engaging portion of said article, a core member in said chamber having a portion for coring said plate cover portion of said article, said core member having a portion fitting said slot, and the end of said last named portion being shaped to core said pedal arm engaging portion of said article.

4. In a mold for a pedal cushion having a plate cover and a pedal arm engaging portion, means providing separable parts forming a mold chamber for said plate cover portion of said article, a chamber in one of said separable portions forming a mold chamber for the pedal arm engaging portion of said article, a core member having a portion in said first chamber and a portion in said second mentioned chamber, and means for centering said core member in said chambers and for releasably locking it in position.

5. In a mold for a pedal cushion having a plate cover and a pedal arm engaging portion, means providing separable parts forming a mold chamber for said plate cover portion of said article, a chamber in one of said separable portions forming a mold chamber for the pedal arm engaging portion of said article, a core member having a portion in said first chamber and a portion in said second mentioned chamber, a recess formed in that separate portion having the mold chamber for the pedal arm engaging portion of said article, a lug on said core member entering said recess, and movable means mounted in said last mentioned separable portion for releasably engaging said lug.

6. In a mold for a pedal cushion having a plate cover and a pedal arm engaging portion, means providing separable parts forming a mold chamber for said plate cover portion of said article, a chamber in one of said separable portions forming a mold chamber for the pedal arm engaging portion of said article, a core member having a portion in said first chamber and a portion in said second mentioned chamber, a recess formed in that separable portion having the mold chamber for the pedal arm engaging portion of said article, a lug on said core member entering said recess, a perforation formed transversely through said lug and connected with the outer side thereof by a slot of less width than said perforation, a bolt having a pair of adjacent reduced portions of different cross-section one of which pair is adapted to fit said perforation of said lug and the other to pass through said slot in said lug.

7. A mold for the article described having separable portions forming the mold chambers 16 and 17, a core member having the plate portion 27 and the shank portion 33, said shank portion being formed with a portion 35 entering the mold chamber 17, and a slot in one of said separable portions receiving said shank.

8. A mold for the article described having separable portions forming the mold chambers 16 and 17, a core member having the plate portion 27 and the shank portion 33, said shank portion being formed with a portion 35 entering the mold chamber 17, and locking means in one of said separable portions engaging said shank.

9. A mold for the article described having separable portions forming the mold chambers 16 and 17, a core member having the plate portion 27 and the shank portion 33, said shank portion being formed with a portion 35 entering the mold chamber 17, and locking means for said core member comprising the bolt 41 and the perforation 37 and slot 39 in said shank.

10. A mold for an article of the character described comprising separable parts having a recess defining the major portion of the contour of the article, a separate core member having a portion which overlaps one of said separable parts, a shank on said core member, one of said separable members having a recess which receives said shank, said shank having communicating larger and smaller openings, a shiftable locking rod intersecting said recess which receives said shank, and said rod having larger and smaller parts adapted respectively to fit said larger opening of said shank and to pass through said smaller opening.

In testimony whereof, I have signed my name to this specification.

JOSEPH F. O. BURMAN.